(No Model.)
A. F. DELAFIELD.
SAW CLAMP.
No. 316,753.  Patented Apr. 28, 1885.
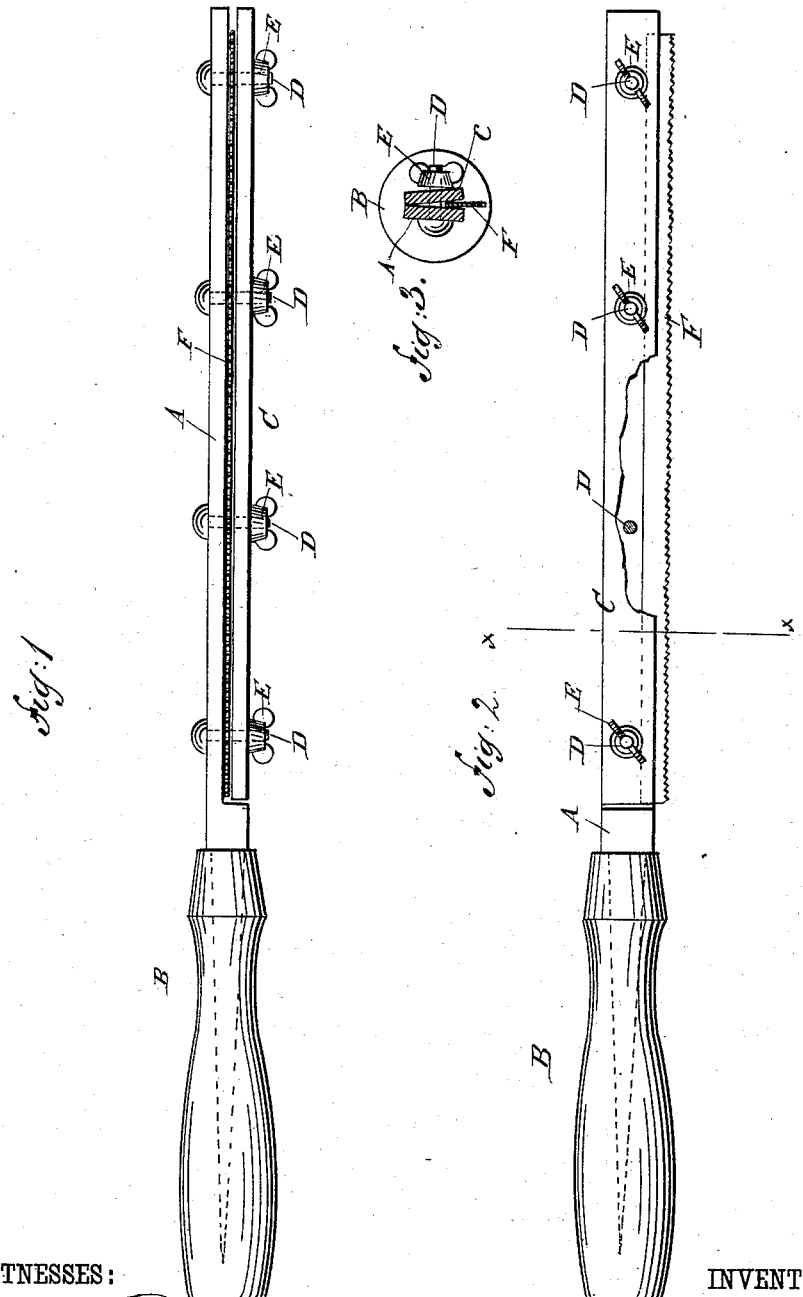

UNITED STATES PATENT OFFICE.

A. FLOYD DELAFIELD, OF NOROTON, CONNECTICUT.

SAW-CLAMP.

SPECIFICATION forming part of Letters Patent No. 316,753, dated April 28, 1885.

Application filed November 19, 1884. (No model.)

*To all whom it may concern:*

Be it known that I, A. FLOYD DELAFIELD, of Noroton, in the county of Fairfield and State of Connecticut, have invented a new and Improved Saw-Clamp, of which the following is a full, clear, and exact description.

The object of my invention is to provide a new and improved clamp for holding firmly and securely short pieces of saws in such a manner that they can be used for sawing through pieces of metal or tubes having no great thickness of metal.

The invention consists in the construction and arrangement of parts, as will be hereinafter fully described and claimed.

Reference is to be had to the accompanying drawings, forming a part of this specification, in which similar letters of reference indicate corresponding parts in all the figures.

Figure 1 is an edge view of my improved saw-clamp. Fig. 2 is a side view of the same, parts being broken out. Fig. 3 is a cross-sectional view of the same on the line $x\,x$, Fig. 2.

A flat bar, A, is held in a handle, B, and against the bar A another flat bar, C, is placed, and the two bars are pressed together by a series of screws, D, and winged nuts E or thumb-screws at the rear edges of the said bars, the said bars forming long jaws. A piece or strip of a saw, F, band-saw, or like cutting implement is placed between the bars A C, and is clamped firmly between the two bars by drawing the nuts or screws up tightly. The saw-blade projects slightly from the front edges of the bars, and can be used for sawing through sheet-metal plates, or sawing through tubes by making a cut through the thickness of the tube entirely around the same, and also for sawing thin rods or bars. A greater or less number of screws D may be used, according to the length of the holder. Small pieces of broken saws can thus be used which are useless without a proper device for holding them.

Having thus described my invention, I claim as new and desire to secure by Letters Patent—

In a saw-clamp, the combination, with two bars and screws for clamping them together and against the saw-blade placed between them, of a handle on which the clamp thus formed is held, substantially as herein shown and described.

A. FLOYD DELAFIELD.

Witnesses:
 OSCAR F. GUNZ,
 C. SEDGWICK.